(12) United States Patent
Seki et al.

(10) Patent No.: US 8,035,265 B2
(45) Date of Patent: Oct. 11, 2011

(54) MOTOR STATOR AND MOLDED MOTOR

(75) Inventors: Yasutake Seki, Fukui (JP); Akihiko Yamazaki, Fukui (JP); Yukinori Nakagawa, Fukui (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/052,464

(22) Filed: Mar. 21, 2011

(65) Prior Publication Data

US 2011/0163629 A1 Jul. 7, 2011

Related U.S. Application Data

(63) Continuation of application No. 12/302,648, filed as application No. PCT/JP2007/060426 on May 22, 2007, now Pat. No. 7,932,650.

(30) Foreign Application Priority Data

Jun. 1, 2006 (JP) .................................. 2006-153401

(51) Int. Cl.
*H02K 3/34* (2006.01)
*H02K 3/30* (2006.01)
*H02K 3/28* (2006.01)

(52) U.S. Cl. ........... 310/71; 310/164; 310/184; 310/194

(58) Field of Classification Search ..................... 310/71, 310/164, 179–180, 184, 194, 198, 208
See application file for complete search history.

(56) References Cited

U.S. PATENT DOCUMENTS

| 4,563,606 | A | 1/1986 | Fukasawa et al. |
| 6,111,334 | A | 8/2000 | Horski et al. |
| 6,628,034 | B2 * | 9/2003 | Jang et al. ..................... 310/210 |
| 6,700,271 | B2 | 3/2004 | Detela |
| 7,145,280 | B2 | 12/2006 | Noble et al. |
| 2004/0232796 | A1 | 11/2004 | Weissensteiner |

FOREIGN PATENT DOCUMENTS

| JP | 57-111038 | | 7/1982 |
| JP | 58-9538 | * | 1/1983 |
| JP | 59-222048 | A | 12/1984 |
| JP | 05-184092 | | 7/1993 |
| JP | 07-046782 | | 2/1995 |
| JP | 2000-069704 | A | 3/2000 |
| JP | 2005-333727 | A | 12/2005 |
| JP | 2006-101656 | A | 4/2006 |

OTHER PUBLICATIONS

International Search Report for International Application No. PCT/JP2007/060426, Aug. 28, 2007, Panasonic Corporation.

* cited by examiner

*Primary Examiner* — Burton Mullins
(74) *Attorney, Agent, or Firm* — RatnerPrestia

(57) ABSTRACT

A motor stator is disclosed. Each of a first phase, second phase and third phase of three-phase winding has multiple toroidal coils and crossover wires connecting the coils. The crossover wire of the first phase runs inside the second phase coil and the third phase coil. The crossover wire of the second phase runs over the first phase coil with a guide by guide posts and runs inside the third phase coil. The crossover wire of the third phase runs over the first phase coil and the second phase coil with a guide by the guide posts.

7 Claims, 6 Drawing Sheets

MOTOR STATOR AND MOLDED MOTOR

This application is a continuation of U.S. patent application Ser. No. 12/302,648, filed Oct. 7, 2009, which is a U.S. National Phase Application of PCT International Application PCT/JP2007/060426, filed May 22, 2007, the entire disclosures of which are incorporated herein by reference.

TECHNICAL FIELD

The present invention relates to a motor stator to be used in home appliances, and it also relates to a molded motor employing the same stator.

BACKGROUND ART

In recent years, motors to be employed in home appliances have been switched from conventional ones to brushless motors in order to obtain higher efficiency from the standpoint of energy saving. This market trend has been accompanied by giving attention to a twin-rotor type three-phase brushless motor which includes magnet-rotors both inside and outside an annular stator. (disclosed in e.g. patent document 1 and patent document 2)

When the annular stator is provided with a toroidal winding, an annular stator core is generally split into equal halves. Then as shown in FIG. 12, first phase coil 60 is wound with a space remaining for a second phase coil, and then the second phase coil is wound on the space. A crossover wire is provided between the first phase coil and the second phase coil, so that it is afraid that the crossover wire sometimes touches the coils of different phases. An insulating procedure thus must be taken, such as sticking an insulating tape to both of first phase coil 60 and the crossover wire of the first phase, before the second phase coil is wound although the tape sticking is a cumbersome work. An insulating space is thus desirably prepared between the coil and the crossover wire for eliminating the tape sticking job.

The stator core provided with toroidal windings is resin-molded, in general, before it is completed as a stator of a motor. The structure of the stator core thus must withstand a high pressure of molding resin and hold an insulating space between the coil and the crossover wire. Patent document 3, for example, discloses a groove for accommodating a crossover wire in order to prevent the crossover wire from touching the coil.

Patent document 1: Unexamined Japanese Patent Application Publication No. 2005-333727
Patent document 2: Unexamined Japanese Patent Application Publication No. 2006-101656
Patent document 3: Unexamined Japanese Patent Application Publication No. H05-184092

DISCLOSURE OF INVENTION

The stator of a motor of the present invention comprises the following elements:
- a stator core including an annular yoke, and teeth at least one of the inside or the outside of the yoke;
- an insulating cover including a plurality of grooves and a plurality of guide posts, and covering the stator core; and
- a three-phase winding wound on the stator core in a toroidal winding manner via the insulating cover.

Each of a first phase, a second phase, and a third phase of the three phase winding includes a plurality of toroidal coils and crossover wires connecting the coils. A crossover wire of the first phase runs through the groove of the insulating cover, and runs inside the coils of second and third phases. A crossover wire of the second phase runs over the first phase coil with a guide by the guide posts of the insulating cover, and then runs through the groove and inside the third phase coil. A crossover wire of the third phase runs over the coils of the first and second phases with a guide by the guide posts. The foregoing structure allows holding the insulating space between the coils and the crossover wires even if a high pressure of molding resin is applied.

DESCRIPTION OF REFERENCE MARKS

Figure 1:
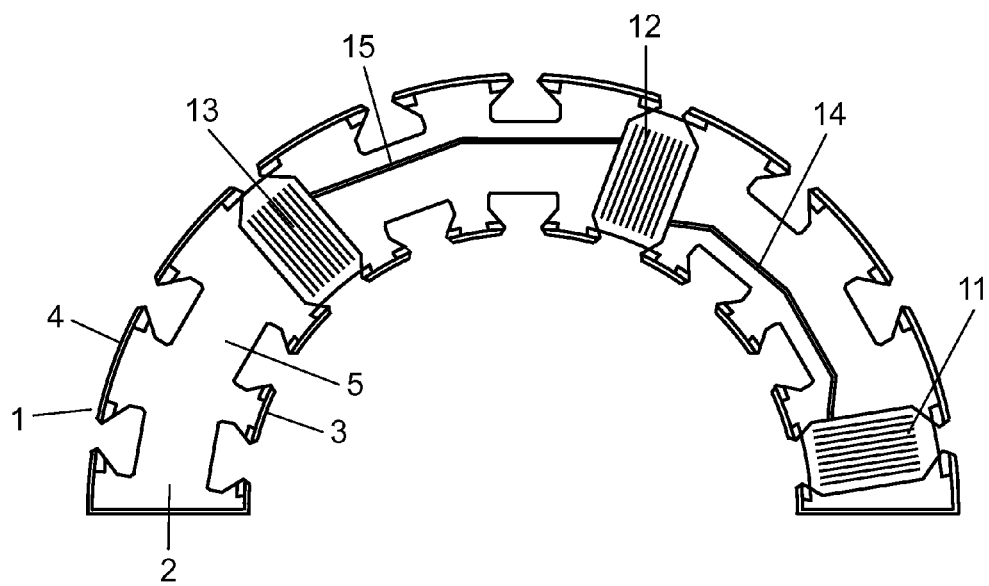
FIG. 1 shows a first phase coil wound on a stator core.

1 stator core
2 yoke
3 inner teeth
4 outer teeth
5 insulating cover
6 thicker section
7 guide post
8 partition
11, 12, 13 first phase coil
14, 15 crossover wire of first phase
16 groove
17 slot opening
18 winding guide
19 holder
21, 22, 23 second phase coil
24, 25 crossover wire of second phase
26 groove
27 coil end
28 groove cover
29 insulating sheet clip
30 insulating sheet
31, 32, 33 third phase coil
34, 35 crossover wire of third phase
50 insulating space

DESCRIPTION OF PREFERRED EMBODIMENT

An exemplary embodiment of the present invention is demonstrated hereinafter with reference to the accompanying drawings. As shown in FIG. 1, one of stator core divided into equal halves, hereinafter referred to as stator core 1, includes inner teeth 3 and outer teeth 4 at both sides of yoke 2. Stator core 1 is covered with insulating cover 5. A first phase coil, second phase coil and third phase coil are sequentially wound in a toroidal winding manner on stator core 1 at respective slots between the teeth. The winding steps are detailed hereinafter.

Figure 2:
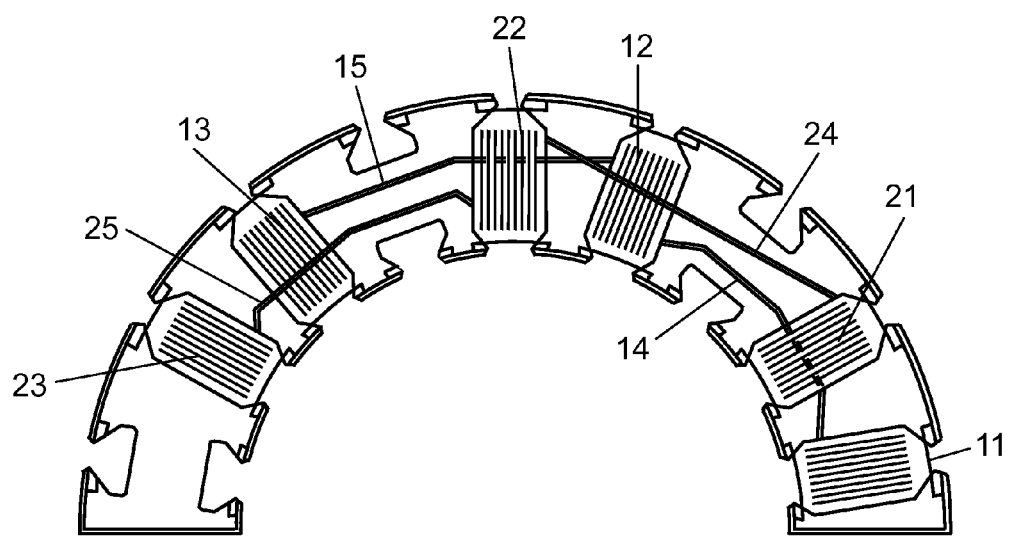
FIG. 2 shows a second phase coil wound on the stator core.

First, as shown in FIG. 1, first phase coils 11, 12, 13 are wound on stator core 1 sequentially via crossover wires 14 and 15 which connect the coils. Next, as shown in FIG. 2, second phase coils 21, 22, 23 are wound sequentially on stator core 1 via crossover wires 24 and 25. Crossover wire 24 runs over first phase coil 12, and crossover wire 25 runs over first phase coil 13. Third phase coils 31, 32, 33 are wound sequentially at slots remaining unoccupied in FIG. 2 (refer to FIG. 4). Crossover wires 34, 35 of the third phase run over the coils, already wound, of the first and second phases. The crossover wires of the respective phases thus cross with the coils of other phases under or above the coils.

Figure 3:
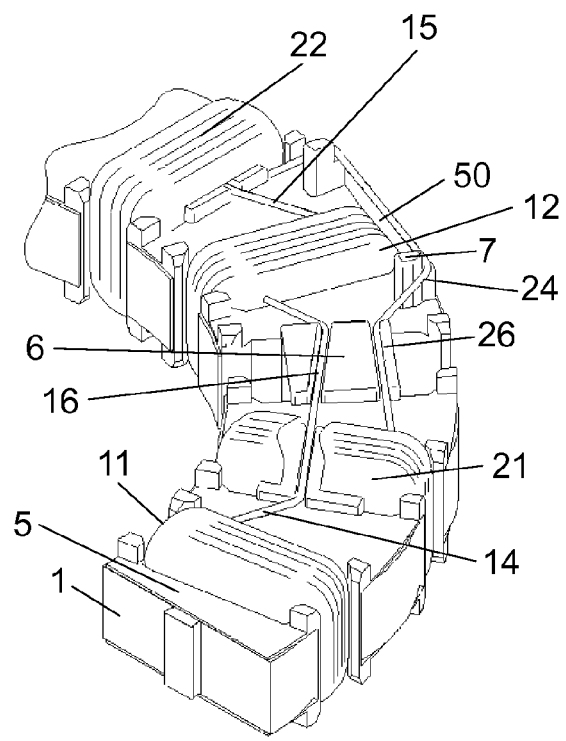
FIG. 3 shows a perspective view in part of the stator core on which a first phase coil and a second phase coil are wound.

FIG. 3 shows a perspective view in part of stator core 1 on which first and second phase coils are wound. Insulating cover 5 includes grooves 16 and 26 at thicker section 6 where the third phase coils are to be wound. Crossover wire 14 of the first phase is accommodated in groove 16, and crossover wire 24 of the second phase is accommodated in groove 26. Insulating cover 5 further includes guide posts 7. Crossover wire 24 runs through groove 26, and then, when it runs over first phase coil 12, it is guided by guide post 7 such that it maintains a predetermined insulating space 50 from first phase coil 12.

Figure 4:
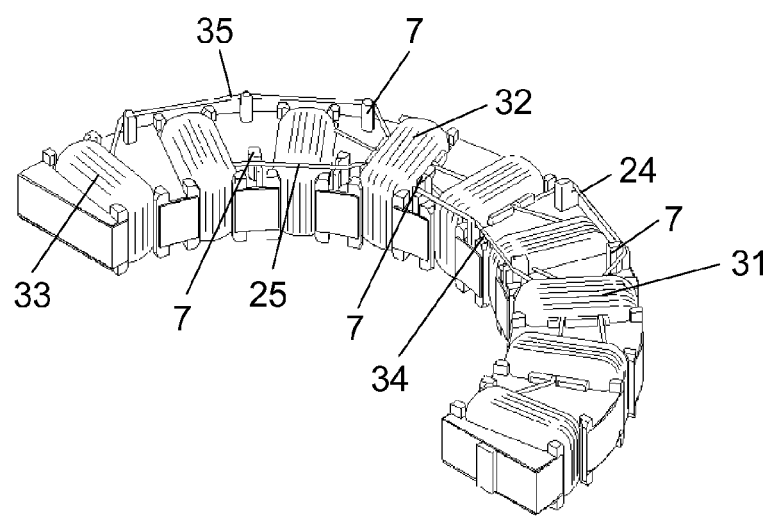
FIG. 4 shows a perspective view of the stator core on which the coils of the first, second and third phases are wound.

FIG. 4 shows a perspective view of stator core 1 on which the first, second and third phase coils are wound. Crossover wires 34, 35 are guided by guide posts 7 such that they maintain a predetermined insulating space from the first phase and second phase coils. Guide posts 7 are placed both at inner wall side and outer wall side of stator core 1 so that the crossover wires can run separately along the inner side and the outer side of stator core 1. This structure allows preventing the crossover wires from touching to each other. In FIG. 4, crossover wire 34 runs along the inner side of stator core 1 separately from wire 24 which runs along the outer side of stator core 1. In a similar manner, crossover wire 25 inner side of stator core 1 is separated from crossover wire 35 outer side of stator core 1.

Figure 5:
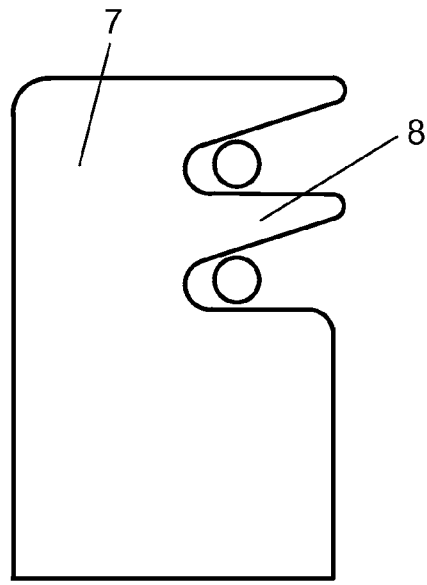
FIG. 5 shows a sectional view of a guide post including a partition.

If the crossover wires cannot be placed separately due to some reason, guide post 7 including partition 8 shown it sectional view in FIG. 5 is used. Since partition 8 separates the crossover wires, this structure allows preventing the crossover wires from touching to each other when this guide post 7 guides the crossover wires of different phases.

Figure 6:
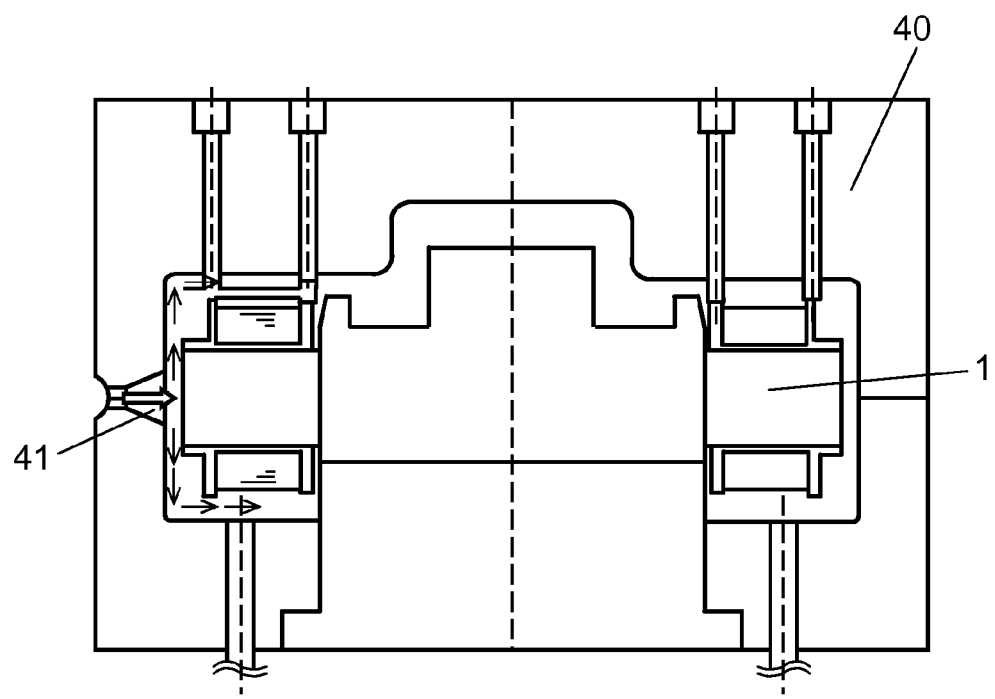
FIG. 6 shows a stator core set in a metal mold.

Stator core 1 including the toroidal coils is molded with resin to be completed as a stator of a motor. FIG. 6 shows stator core 1 set in metal mold 40. It is essential for the coils and the crossover wires of stator core 1 not to be deformed by a high pressure of resin flow supplied from mold gate 41 in order to maintain the predetermined insulating space therebetween.

Measures taken against the pressure of the resin flow are to separate the crossover wire from the coils of different phases. For instance, a crossover wire running under a coil can be protected from the pressure of resin flow by the coil. When a crossover wire runs above the coil, a narrower interval between the guide posts will minimize a deviation of the crossover wire due to the resin flow.

Figure 7:
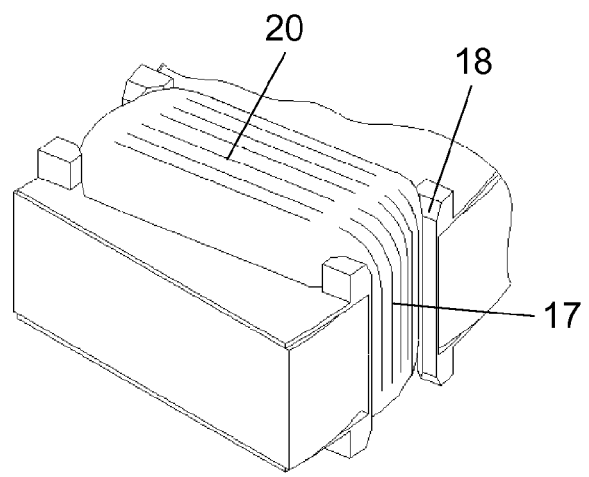
FIG. 7 shows a winding guide provided at a slot opening.

As shown in FIG. 7, slot opening 17 is provided with winding guides 18, which guide the wire to opening 17 when the wire is wound as well as hold coil 20 when stator core 1 is molded for preventing coil 20 from being deformed by the pressure of the resin flow.

Thermosetting resin is preferably used for molding. The stator in accordance with this embodiment of the present invention can be used in a molded motor. To be more specific, the stator of this embodiment can be used in a molded motor at its motor frame which is molded of thermosetting resin. During the molding, when a high pressure of thermosetting resin is applied, the structure of this molded motor allows maintaining the insulating space between the coils and the crossover wires.

Improvements of the stator core to a job in the steps of winding and to a reliability of insulation between phases of three-phase windings are described hereinafter with reference to FIG. 8-FIG. 11.

Figure 8:
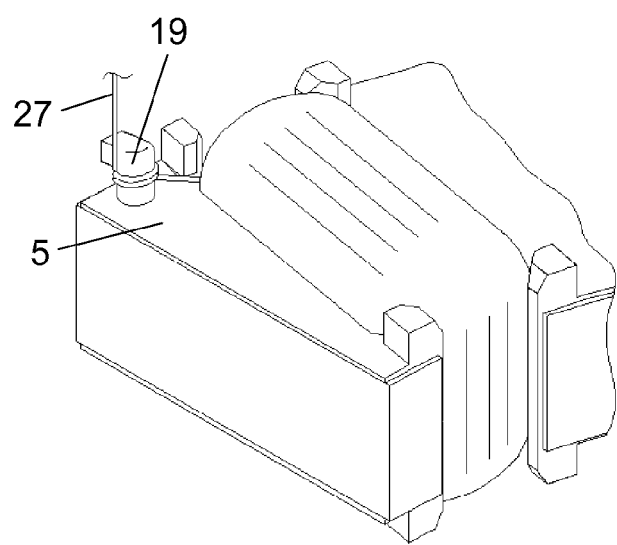
FIG. 8 shows a wire-end holder provided to an insulating cover.

During the step of winding the first phase coil, second phase coil, and third phase coil sequentially on the stator core, coil ends 27 of respective coils must be fixed to somewhere in order to prevent the coils from loosening. As shown in FIG. 8, projecting holder 19 is provided on insulating cover 5 at the vicinity of the coil end, and coil end 27 is tied to holder 19 so that the coil can be prevented from loosening.

Figure 9:
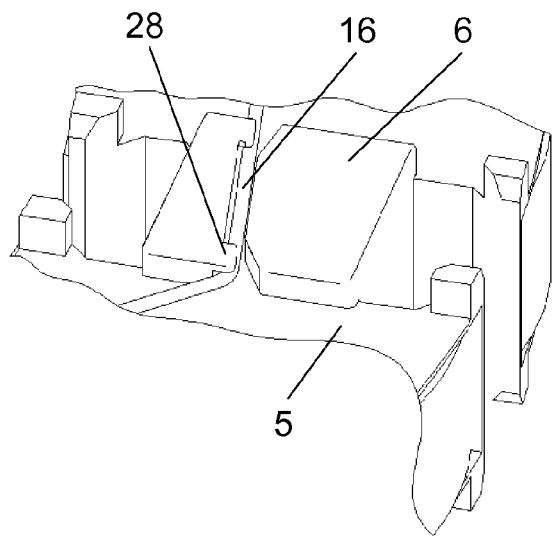
FIG. 9 shows a cover of a groove which accommodates a crossover wire.

As shown in FIG. 9, cover 28 is provided to an inner wall of groove 16 (refer to FIG. 3) of insulating cover 5 so that cover 28 can hold the crossover wire within groove 16 and prevents the crossover wire from approaching to the coil wound on thicker section 6.

Figure 10:
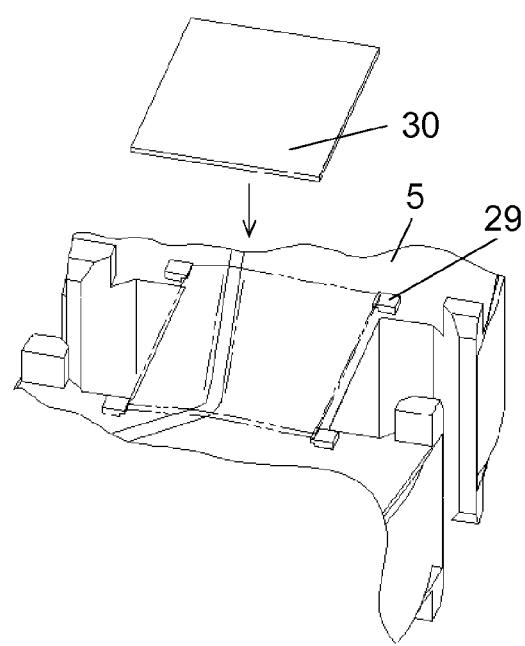
FIG. 10 shows insulation provided to the crossover wire.

FIG. 10 does not show thicker section 6 or groove 16 in insulating cover 5 although they are shown in FIG. 9. Insulating sheet 30 is mounted on the crossover wires for insulating them from the coils. Since there is no thicker section 6, the thickness of the stator is reduced. Insulating sheet 30 can be mounted with ease by adhesive or by sheet clips 29 provided on insulating cover 5.

Figure 11:
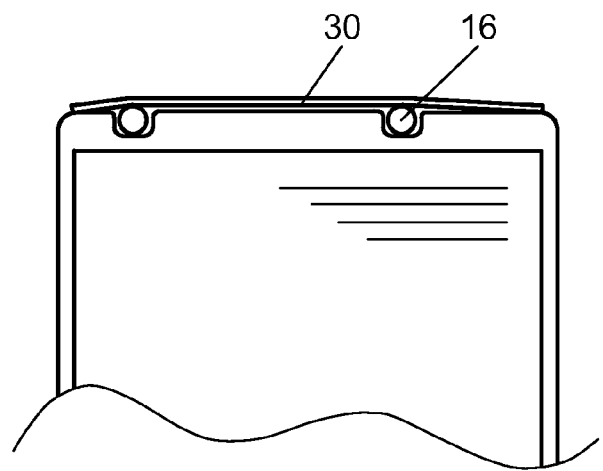
FIG. 11 shows another insulation provided to the crossover wire.
Figure 12:
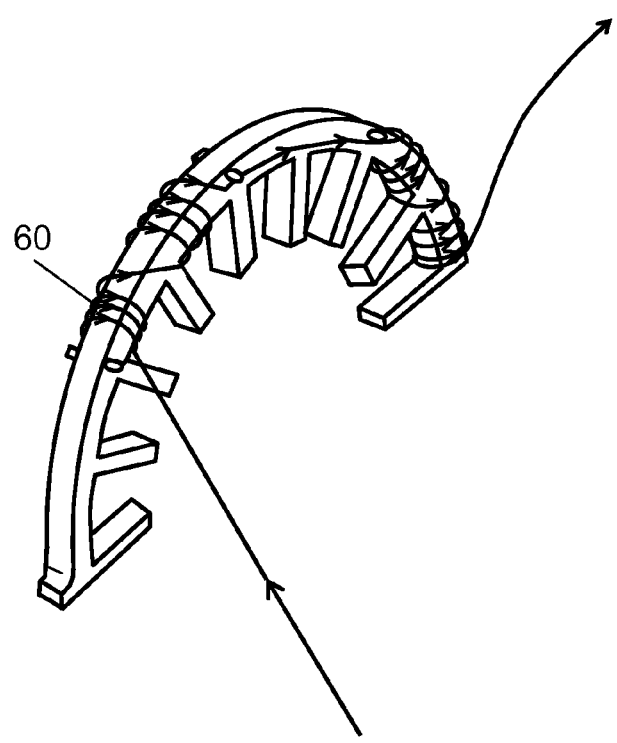
FIG. 12 shows a conventional toroidal winding.

As shown in FIG. 11, the crossover wires can be accommodated in shallower groove 16, and then insulating sheet 30 can be mounted thereon.

INDUSTRIAL APPLICABILITY

A stator of the present invention is highly reliable about the insulation between the phases of three-phase windings, so that the stator can be used not only in brushless motors but also in induction motors.

The invention claimed is:

1. A motor stator comprising:
a stator core including an annular yoke and teeth provided to at least one of an inside of the yoke and an outside of the yoke;
an insulating cover which covers the stator core and includes at least one groove; and
three-phase windings wound on the stator core in a toroidal winding manner via the insulating cover,
wherein each of a first phase, a second phase and a third phase includes a plurality of coils wound in the toroidal manner and a crossover wire connecting the coils, and
wherein a crossover wire of at least one of the first phase, the second phase, and the third phase runs through the at least one groove and within a coil of another one of the first phase, the second phase, and the third phase.

2. The motor stator of claim 1, wherein the stator core is divided into equal halves.

3. The motor stator of claim 2, wherein the insulating cover includes a projecting holder for holding a coil end.

4. The motor stator of claim 1, wherein the insulating cover includes a winding guide formed at a slot opening.

5. The motor stator of claim 1, wherein the insulating cover includes a groove cover formed on an inner wall of the groove.

6. The motor stator of claim 1, wherein the crossover wire runs over the insulating cover, and an insulating sheet is disposed on the crossover wire, and the plurality of coils wound in the toroidal winding manner is disposed on the insulating sheet.

7. A molded motor comprising a motor frame, which includes the motor stator as defined in claim 1 and is molded of thermosetting resin.

* * * * *